United States Patent
Mohtashemi et al.

(10) Patent No.: US 10,063,155 B2
(45) Date of Patent: Aug. 28, 2018

(54) MULTI-SIGNAL DIGITAL CONTROLLER FOR ISOLATED SYSTEM FEEDBACK LOOP

(71) Applicant: Apple Inc., Cupertino, CA (US)

(72) Inventors: Behzad Mohtashemi, Cupertino, CA (US); Asif Hussain, San Jose, CA (US); Manisha P. Pandya, Saratoga, CA (US); Mohammad J. Navabi-Shirazi, Cupertino, CA (US); Nileshbhai J. Shah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 195 days.

(21) Appl. No.: 15/148,870

(22) Filed: May 6, 2016

(65) Prior Publication Data
US 2016/0329820 A1 Nov. 10, 2016

Related U.S. Application Data

(60) Provisional application No. 62/158,365, filed on May 7, 2015.

(51) Int. Cl.
*H02M 3/335* (2006.01)
*H02M 1/32* (2007.01)
*H02M 1/00* (2006.01)

(52) U.S. Cl.
CPC ......... *H02M 3/33523* (2013.01); *H02M 1/32* (2013.01); *H02M 2001/0009* (2013.01)

(58) Field of Classification Search
CPC ..... H02M 3/33507; H02M 2007/4815; H02M 2007/4818; H02M 1/083; H02M 3/33515; H02M 3/132; H02M 2001/0012; H02M 2001/0025; H02M 3/33538; H02M 3/33576

See application file for complete search history.

(56) References Cited

U.S. PATENT DOCUMENTS

| | | | |
|---|---|---|---|
| 6,956,750 B1 | 10/2005 | Eason | |
| 7,692,910 B2 | 4/2010 | Lavier | |
| 8,144,487 B2 | 3/2012 | Djenguerian | |
| 8,587,970 B2 | 11/2013 | Uno | |
| 2010/0103703 A1* | 4/2010 | Nishiyama | H02M 3/3376 363/17 |

* cited by examiner

*Primary Examiner* — Adolf Berhane
*Assistant Examiner* — Afework Demisse
(74) *Attorney, Agent, or Firm* — Blank Rome LLP

(57) ABSTRACT

Various systems and methods are disclosed herein, which provide isolated systems with an auxiliary, multi-signal digital feedback loop for reporting a plurality of different potential fault conditions in an output system (e.g., output short circuit, output over-voltage, output under-voltage, output over temperature, etc.) to a Primary Controller in an input system. The signals may be sent according to any desired standardized (or proprietary) data transmission protocols. Use of a digital feedback loop allows the signals to be passed to the Primary Controller more quickly than is allowed by traditional analog feedback paths—and while using only a single optocoupler device for the transmission of all fault conditions. The techniques disclosed herein are applicable to any number of isolated systems that supply power to electronic systems such as: digital cameras, mobile phones, watches, personal data assistants (PDAs), portable music players, monitors, as well as desktop, laptop, and tablet computers.

22 Claims, 5 Drawing Sheets

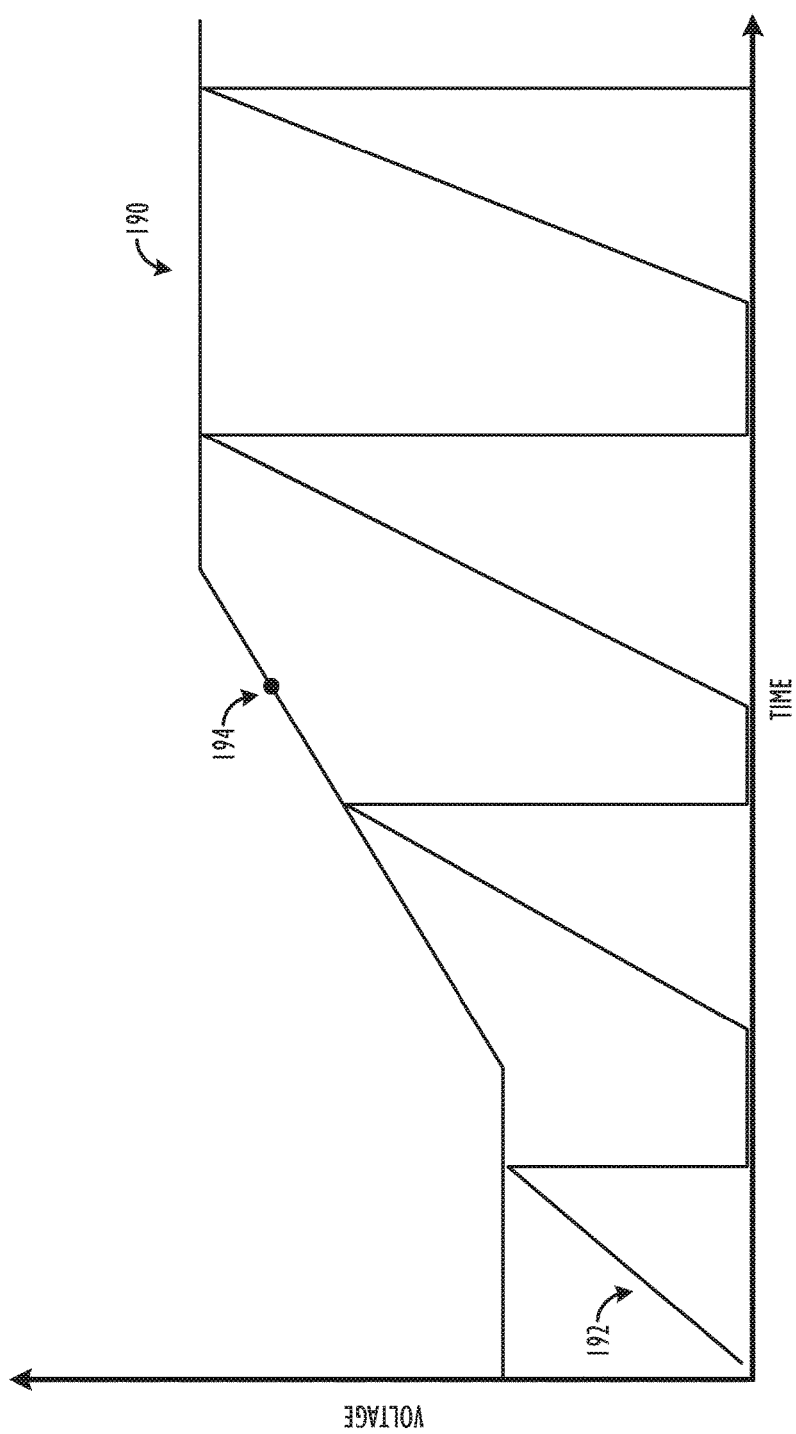

MULTI-SIGNAL DIGITAL CONTROLLER FOR ISOLATED SYSTEM FEEDBACK LOOP

CROSS-REFERENCE TO RELATED APPLICATION

This application claims priority to U.S. Provisional Application No. 62/158,365, filed May 7, 2015, the contents of which are fully incorporated by reference herein.

BACKGROUND

This disclosure relates generally to the field of providing digital feedback in isolated systems.

In isolated systems, like flyback converters, the input circuitry (i.e., the "Primary Controller") and the output circuitry (i.e., the "Secondary Controller") are not electrically/galvanically connected to each other. Flyback converters are commonly used as isolated battery chargers and/or front-end AC-DC and DC-DC converters in switch mode power supply applications. For example, a common flyback converter is a buck-boost converter including an inductor that is split to form a transformer. A primary winding of the transformer is coupled to the input circuitry, and a secondary winding of the transformer is coupled to the output circuitry, thus providing the desired isolation between the input circuitry and the output circuitry. Therefore, any communication between the two modules must be carried out by some form of opto-isolator or optocoupler device.

Since optocouplers are relatively bulky and costly, it is prudent to limit the quantity of optocouplers that will be used in a given circuit. However, certain information must be passed from the secondary or output side of the converter to the Primary Controller for proper system regulation. For example, information regarding output voltage and/or current regulation, short circuit, output over voltage, output under-voltage, and over temperature are some of the exemplary signals that may be passed from the output side of the converter to the Primary Controller in a given implementation.

In standard configurations, the key signals are passed from the Secondary Controller to the Primary Controller through the pin that controls the loop regulation, also referred to herein as the "COMP node." For example, in certain fault conditions, such as output system shorts to ground, the flyback converter can't react immediately to rectify the problem. When the output system voltage drops to abnormal levels, the COMP node rises to correct the problem. When the COMP node rises high enough, i.e., beyond the dynamic range of the controller, the over current protection circuit triggers to limit the current or turn off the system. Unfortunately, the response time for this behavior is limited by the bandwidth of the system, which can be quite slow, e.g., in the range of 5 kHz to 10 kHz. This latency can be problematic and harmful to the output system—even leading to its potential destruction.

In the embodiments described herein, systems and methods are proposed by which a plurality of different fault conditions may be digitally transmitted from the secondary side to the primary side of the converter fast enough so that the Primary Controller may be turned off before any subsequent complications can occur in the output system.

SUMMARY

Described herein are various methods and devices for an improved flyback converter with a digital feedback path for improved multi-signal feedback from the isolated output system, as well as optionally maintaining an analog feedback path for certain system functions, such as voltage regulation.

In some embodiments described herein, the COMP node of the Primary Controller is not used for triggering the fault conditions on the primary side. Instead, an auxiliary path, which may be digital in nature and faster than the analog feedback path, may monitor the output system voltage and other output system conditions, such as: output over-voltage, output under-voltage, and over temperature, etc. As soon as a fault condition is triggered by the sensor circuitry of the secondary side, it may be relayed back to the primary controller via the faster auxiliary digital feedback path via any suitable standardized or proprietary signaling protocol.

According to some embodiments described herein, the transfer of data through the secondary, i.e., auxiliary, digital feedback path is not limited by the relatively slower analog response of the primary controller's COMP pin. Thereby, any type of signal indicative of any type of fault condition (including, of course, a short circuit condition) may be sent through the auxiliary digital path to the primary controller in a short enough amount of time that system damage may potentially be avoided.

In still other embodiments, if more than one signal needs to be sent from the output system to the primary controller, such signals may be serialized by the output system, sent through a single optocoupler to the Primary Controller, and then be converted back to parallel signals again.

BRIEF DESCRIPTION OF THE DRAWINGS

FIG. 1C illustrates, in line graph form, the process of using the COMP node of the Primary Controller to detect a short circuit condition in the output system of an isolated system with analog feedback.

DESCRIPTION

Figure 1A:
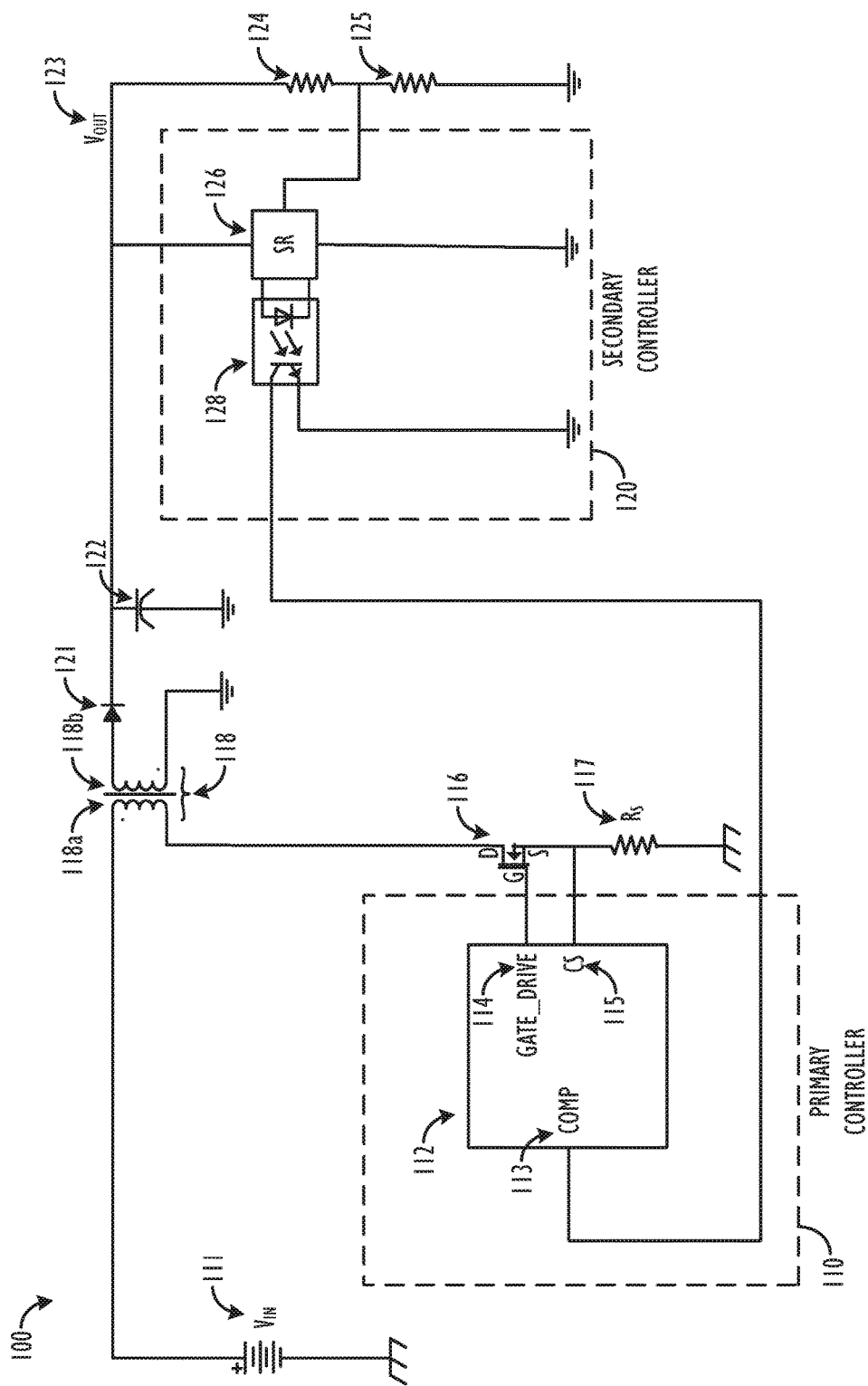
FIG. 1A illustrates an exemplary flyback converter.

Various systems and methods are disclosed herein, which provide isolated systems with an auxiliary, multi-signal digital feedback loop for reporting a plurality of different potential fault conditions in an output system (e.g., output short circuit, output over-voltage, output under-voltage, output over temperature, etc.) to a Primary Controller in an input system. The signals may be sent according to any desired standardized (or proprietary) data transmission protocols. Use of a digital feedback loop allows the signals to be passed to the Primary Controller more quickly than is allowed by traditional analog feedback paths—and while using only a single optocoupler device for the transmission of all fault conditions. The techniques disclosed herein are applicable to any number of isolated systems that supply power to electronic systems such as: digital cameras, mobile phones, watches, personal data assistants (PDAs), portable music players, monitors, as well as desktop, laptop, and tablet computers.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

A typical closed loop flyback converter is made up of two components: 1.) the Primary Controller; and 2.) the Secondary Controller. During times when the output system is shorted, the Primary Controller responds to the fault condition through the (analog) COMP node of the primary controller.

When the COMP node moves beyond the dynamic range of the system, a fault signal is triggered that will either limit the current or turn off the system. Since the COMP node's movement is relatively slow (and is limited by the bandwidth of the system, which may typically be in the range of 1-10 kHz), it can take an unacceptably long amount of time before the system reacts and triggers the fault protection circuitry, thus resulting in potential further damage to the output system.

In standard systems, the information is transferred from the Secondary Controller to the Primary Controller using only a single optocoupler. For example, during an output short condition, the Primary Controller responds to the fault condition through the COMP node. When the COMP node moves beyond the dynamic range of the system, a fault signal is triggered that will either limit the current or turn off the system.

Since the COMP node's movement is relatively slow and is limited by the bandwidth of the system, it can take an unacceptably long amount of time before the system reacts and triggers the appropriate fault protection circuitries.

Due to the relatively high cost of optocouplers, many important fault condition signals—such as over-temperature or output under-voltage—are not even transferred to the Primary Controller in typical systems because the system design is unable to accommodate separate optocouplers for each fault condition, or it would be prohibitively expensive to do so for a given application.

Referring now to FIG. 1A, an exemplary flyback converter 100 is illustrated. A flyback converter is essentially a buck-boost converter with the inductor split to form a transformer, such that the voltage ratios are multiplied—with an additional advantage of isolation between the input system and output system. Flyback converter 100 includes five main parts: 1.) the voltage source 111; 2.) the transformer 118 (consisting of primary winding 118a and secondary winding 118b; 3.) main switch 116; 4.) Primary Controller system, 110; and 5.) Secondary Controller system 120.

Within Primary Controller system 110, there is a controller 112 comprising a plurality of input and output pins. For example, the aforementioned COMP pin 113 is used to trigger a fault signal that will either limit the current or turn off the system. Also depicted in FIG. 1A is a GATE_DRIVE 114 pin, which drives main switch 116. Finally, controller 112 comprises a current sense (CS) pin 115 that is used, in conjunction with resistor $R_S$ 117, to sense the transformer primary current (or input current).

The output system comprises blocking diode 121 and output capacitor 122. When the switch 116 is closed, the primary winding 118a of the transformer is directly connected to the input voltage source 111. The primary current and magnetic flux in the transformer 118 increases, thereby storing energy in the transformer. The voltage that is induced in the secondary winding 118b is negative, so the diode 121 is reverse-biased (i.e., blocking). During this time, the output capacitor 122 supplies energy to the output load. The output voltage may be measured at point 123. When the switch 116 is opened, on the other hand, the voltage across the primary winding 118a reverses to try and maintain the primary current. The secondary voltage is positive, thus forward-biasing the diode 121 and allowing current to flow from the transformer 118 to the output load and output capacitor 122. The energy from the transformer core thus recharges the capacitor and supplies power to the secondary system load.

Within Secondary Controller system 120, there is an optocoupler device 128 and a shunt regulator 126. Shunt regulator 126, in conjunction with a voltage divider comprising resistors 124 and 125 report back the output voltage level 123 via the optocoupler 128 to primary controller 110 in real-time, analog fashion. As mentioned above, the feedback from optocoupler 128 is analog in nature and, thus, relatively slow in reaching COMP node 113 of the primary controller, thus resulting in possible damage to the secondary system if fault protection circuitries are not triggered in time in response to the fault condition sensed by the Secondary Controller 120.

Figure 1B:
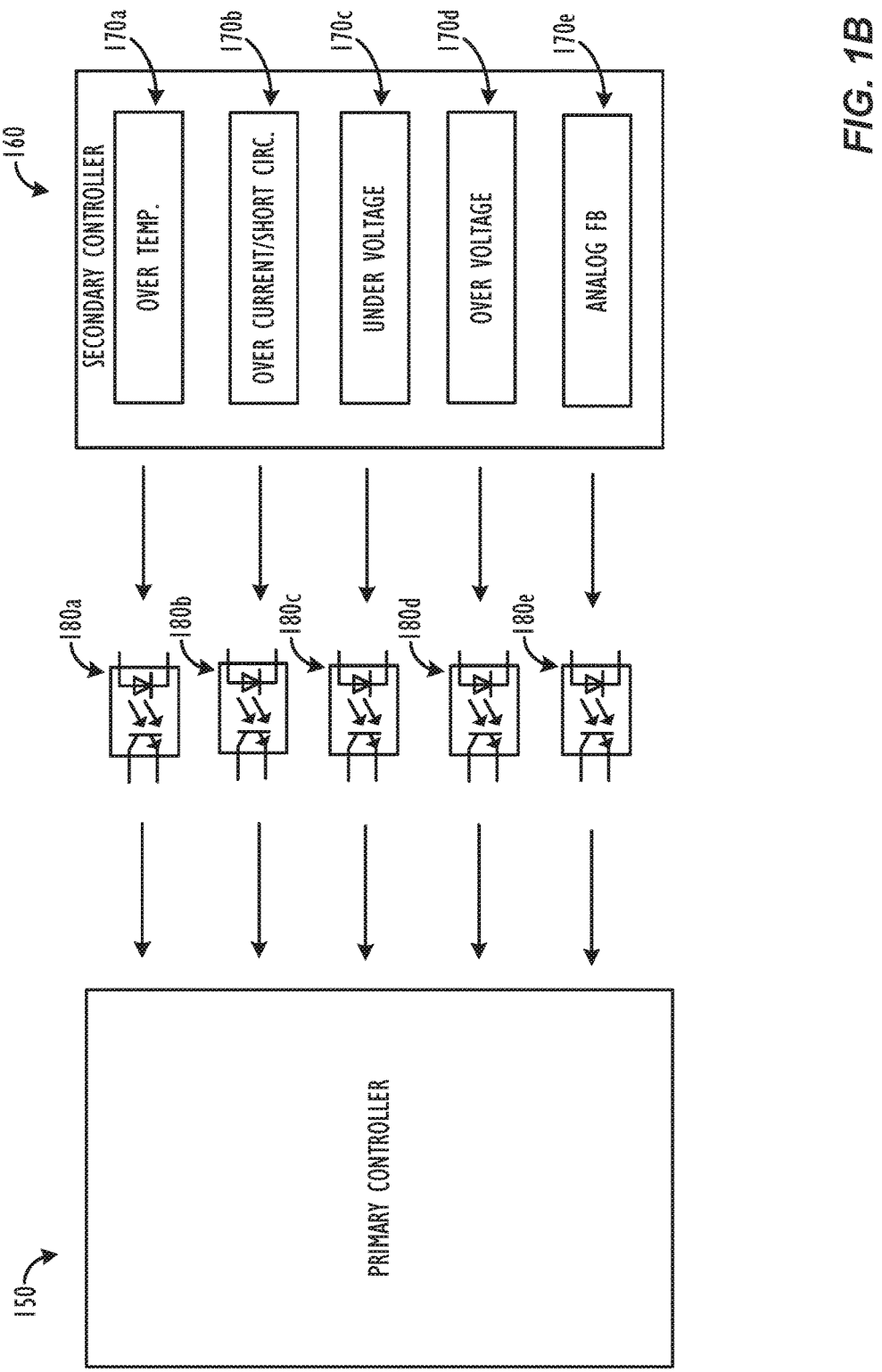
FIG. 1B illustrates an exemplary output system using separate optocouplers for individual feedback signals.

Referring now to FIG. 1B, an exemplary output system Secondary Controller 160 using separate optocouplers 180a-e for transmitting individual feedback signals 170a-e to an input system Primary Controller 150 is illustrated. In FIG. 1B, the Secondary Controller 160 is shown as specifically sending over temperature signal 170a via optocoupler 180a, over current/short circuit signal 170b via optocoupler 180b, under-voltage signal 170c via optocoupler 180c, over-voltage signal 170d via optocoupler 180d, and analog feedback signal 170e via optocoupler 180e. As may be appreciated, this configuration has the advantage of having individual analog signal channels for each of the five exemplary feedback signals, but it has the disadvantages of slower response times (as compared to digital feedback), as well as high cost and high space requirements, due to the large number of optocouplers required (i.e., one optocoupler for each fault condition reported).

Referring now to FIG. 1C, a process for using the COMP node of the Primary Controller to detect a short circuit condition in the output system of an isolated system with analog feedback is illustrated in line graph form. The y-axis of the line graph represents voltage levels, and the x-axis of the line graph represents time.

The line graph of FIG. 1C illustrates that the voltage signal from a loop regulation optocoupler is analog in nature. Line 192 represents the current sense signal 115 in FIG. 1A. Once the current in the primary system reaches a threshold determined by the value of the COMP node voltage, the controller 112 turns off the main switch 116. As may now be more full appreciated, the higher the COMP node voltage is, the higher the current in the primary system must be before the main switch 116 shuts off. As output voltage goes down, the COMP node voltage (represented by line 190) starts going up, until it eventually reaches the output short circuit threshold value 194. Beyond this point, the current in the primary system will eventually reach its maximum value (see the last two triangle waveforms on line 192). The system will begin current limiting once the COMP node voltage has reached its maximum plateau. As is shown along the x-axis of the graph, this process takes time. Ideally, the input system COMP node voltage would go from its low point to its high point immediately (i.e., almost digital in nature). In an analog feedback system, however, this process takes time due to system bandwidth constraints, e.g., in the range of 1-10 kHz. Thus, it takes some amount of time for the system to get from a 'stable' state to a 'current limiting' state. This time delay is a disadvantage of using this type of analog signal to send information from the secondary system to the primary system. Because of this delay, designers may have to add additional system components, such as fuses (which are bulky, costly, and irreversible) to ensure the system doesn't get damaged in a short or other fault condition situation. However, due to the particular size, space, and/or cost considerations of certain implementations, such a process may be used to provide feedback to the Primary Controller in some embodiments.

Figure 2:
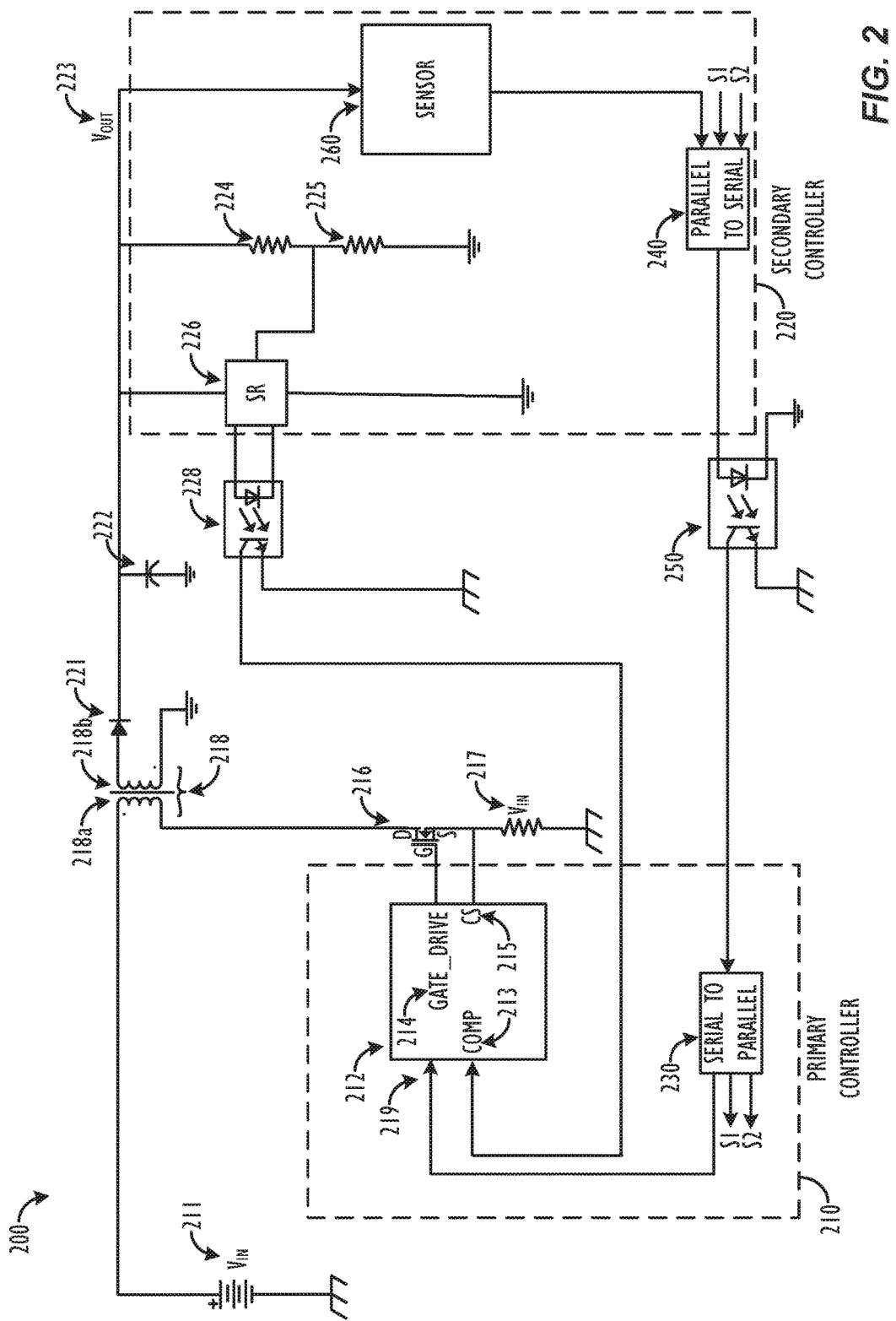
FIG. 2 illustrates an exemplary improved flyback converter design with a digital auxiliary feedback loop, in accordance with one embodiment.

Referring now to FIG. 2, an exemplary improved flyback converter design 200 with a digital auxiliary feedback loop is illustrated, in accordance with one embodiment. Flyback converter 200 includes the same five main parts as flyback converter 100 shown in FIG. 1A: 1.) the voltage source 211; 2.) the transformer 218 (consisting of primary winding 218a and secondary winding 218b; 3.) main switch 216; 4.) Primary Controller system, 210; and 5.) Secondary Controller system 220.

One of the primary differences between improved flyback converter design 200 with a digital auxiliary feedback loop and the flyback converter 100 shown in FIG. 1A is that the Secondary Controller system 220 of flyback converter design 200 additionally includes sensor(s) 260. While shunt regulator 226 and optocoupler 228 may still be used to send analog feedback regarding output voltage level 223 to the COMP pin 213 of controller 212 for output voltage regulation, as described above in reference to flyback converter 100 shown in FIG. 1A, one or more sensors 260 may be used to directly detect any number of desired fault conditions, such as the aforementioned: output short circuit, output over-voltage, output under-voltage, output over temperature, etc. As may be understood, in some embodiments, a different sensor 260 may be utilized to sense each type of feedback signal (e.g., one sensor for voltage conditions, one sensor for temperature conditions, etc.). As illustrated in FIG. 2, a first signal (S1) from a first sensor (e.g., related to over/under-voltage conditions) and a second signal (S2) from a second sensor (e.g., related to over/under-temperature conditions) could be output to parallel-to-serial converter 240 in a parallel fashion, before being serialized and transmitted via optocoupler 250 according to a desired transmission protocol. In other embodiments, sensor block 260 may represent a single sensor package that is capable of sensing more than one type of feedback signal and outputting the corresponding sensor values, e.g., in a parallel fashion.

Thus, according to improved flyback converter design 200, the COMP node is not used for triggering the fault conditions on the primary side. Instead, an auxiliary path— that is digital in nature and may be up to orders of magnitude faster than an analog feedback path—monitors as many fault condition signals as are required in the system implementation. As soon as a fault condition is triggered by the sensor 260 circuitry, it may be relayed back to the primary controller 210 though the auxiliary digital feedback loop, which comprises parallel-to-serial converter 240 and optocoupler 250, as will be described in greater detail below.

According to this embodiment, transfer of data through the secondary digital feedback loop is not limited by the much slower analog response of COMP pin 213. Thereby, any signal may be sent through this pathway to the primary controller 210. If more than one signal needs to be sent, they may be serialized by parallel-to-serial converter 240, sent through the optocoupler 250, and then converted back to parallel signals again at the primary controller 210 by serial-to-parallel converter 230, where they are eventually received as input at input pin 219 so that the controller 212 may take appropriate action based on the received signal. Any desired standard data transmission protocol, e.g., the UART 7-bit, 8-bit, or 9-bit protocols—or any proprietary data transmission protocol—may be used to send the serialized fault condition codes from the secondary system to the primary system. Since the fault condition codes are expected to occur relatively sparsely over time, the auxiliary digital feedback loop provides a convenient, asynchronous method of quickly conveying the necessary information to the primary controller in an efficient and low-power manner.

Certain embodiments may also employ the use of 'start' symbols and 'end' symbols in the data transmission protocol scheme so as to indicate when a payload of fault condition data is being transmitted, and so as to limit the number of bits that need to be transmitted to the minimal number needed to convey the number of different types of fault conditions that sensor 260 is capable of sensing (e.g., up to 8 fault conditions could be encoded by 3-bits, up to 16 fault conditions could be encoded by 4-bits, etc.).

Should a proprietary data transmission protocol be employed in a particular embodiment, the primary controller 210 would potentially need to be customized with the appropriate logic to be able to interpret and respond correctly to the data that it receives from the secondary system that is encoded according to the proprietary data transmission protocol. Such custom logic may be stored in memory of the controller 212. The memory may include one or more different types of media used by the controller 212 to perform device functions. For example, the memory may include memory cache, read-only memory (ROM), and/or random access memory (RAM). In particular, the memory may be used to retain computer program instructions or code organized into one or more modules and written in any desired computer programming language. When executed by, for example, a processor, such computer program code may implement one or more of the functions described herein.

Generally speaking, individual circuit components in FIG. 2 bearing element numerals 2xx are of the same type and have the same functionality as the corresponding circuit components in FIG. 1A bearing corresponding element numerals 1xx, unless otherwise so noted herein.

Figure 3:
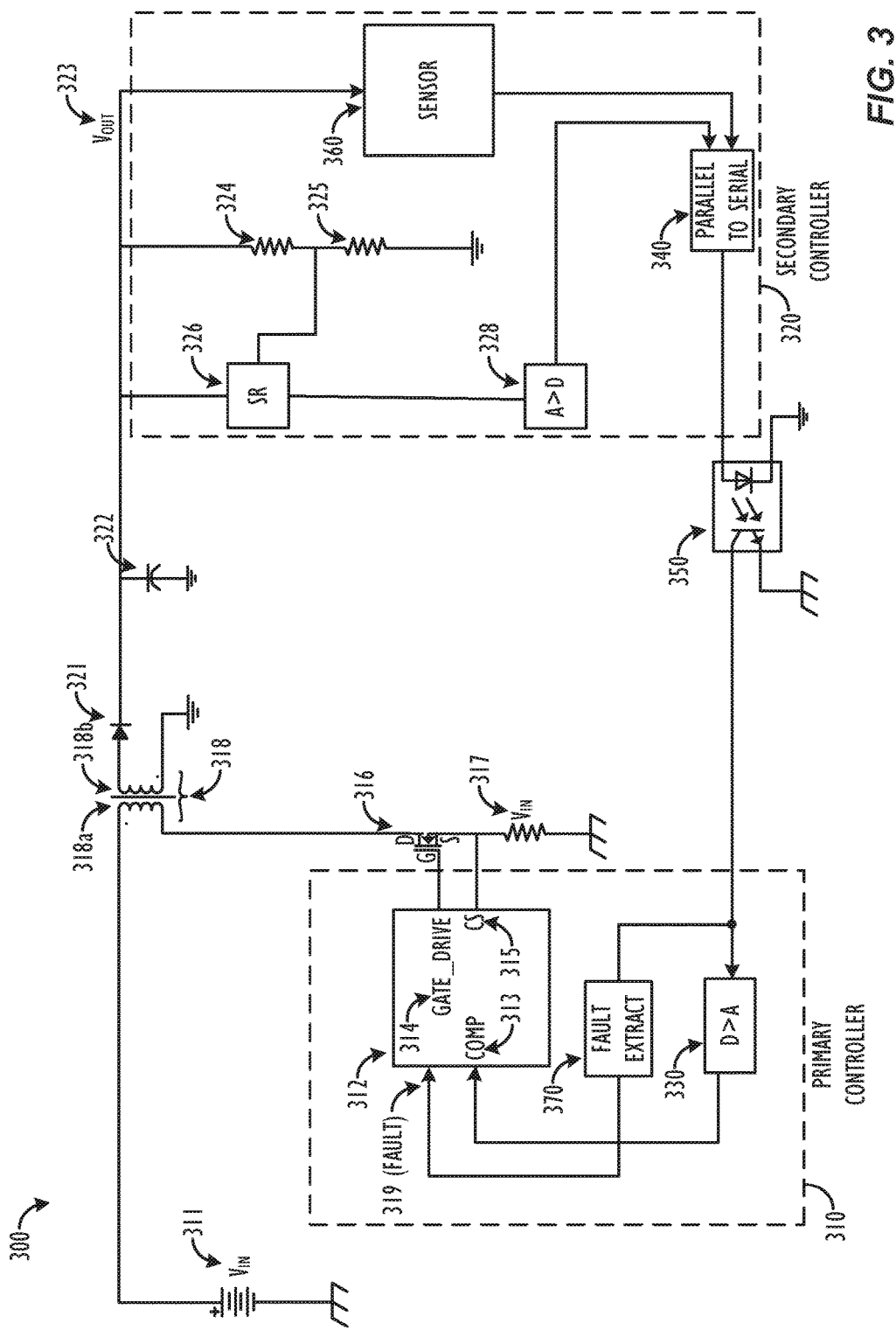
FIG. 3 illustrates an exemplary improved flyback converter design with only a digital feedback loop, in accordance with one embodiment.

Referring now to FIG. 3, an exemplary improved flyback converter design 300 with only a digital feedback loop is illustrated, in accordance with one embodiment. As with FIG. 2, flyback converter 300 includes the same five main parts as flyback converter 100 shown in FIG. 1A: 1.) the voltage source 311; 2.) the transformer 318 (consisting of primary winding 318a and secondary winding 318b; 3.) main switch 316; 4.) Primary Controller system, 310; and 5.) Secondary Controller system 320.

One of the primary differences between improved flyback converter design 300 with only a digital feedback loop and the flyback converter 200 shown in FIG. 2 is that the Secondary Controller system 320 of flyback converter design 300 does not comprise a corresponding optocoupler to optocoupler 228 in FIG. 2 for sending the analog voltage regulation information to the COMP pin of Primary Controller 310. Instead, all of the signals from Secondary Controller 320 are sent to Primary Controller 310 via a digital feedback loop. In particular, the output from shunt regulator 326 is converted from analog to digital by analog-to-digital converter 328, and then serialized, along with the output from one or more sensor(s) 360 by parallel-to-serial converter 340, before being sent through the optocoupler 350 according to a desired data transmission protocol. As with the circuit design 200 described above with reference to FIG. 2, the sensor 360 may actually comprise a separate sensor 360 for each type of feedback signal sensed, while, in other embodiments, sensor block 360 may represent a single sensor package that is capable of sensing more than one type of feedback signal and outputting the corresponding sensor values, e.g., in a parallel fashion. Once received at primary controller 310, the signal is parsed by fault extraction unit 370 to extract the encoded feedback signal(s), and the COMP node signal is then converted back to analog by digital-to-analog converter 330, where it is eventually received as input at the COMP node pin 313 so that the controller 312 may take appropriate action based on the received signal. Fault conditions extracted from the feedback signal may separately be passed to a fault pin 319 of the controller 312.

One advantage to the system shown and described in reference to FIG. 3 over the system shown and described in reference to FIG. 2 is that it does not need a corresponding equivalent to analog optocoupler 228 anymore for the output voltage regulation feedback loop. However, disadvantages may include the fact that the data being sent over the sole digital feedback path must be continuous (i.e., the digitally-encoded form of the analog signal from the shunt regulator 326 will be transmitted continuously), thus resulting in delays for analog-to-digital and digital-to-analog signal conversion, as well as increased power consumption.

Again, generally speaking, individual circuit components in FIG. 3 bearing element numerals 3xx are of the same type and have the same functionality as the corresponding circuit components in FIG. 2 bearing corresponding element numerals 2xx, unless otherwise so noted herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

The invention claimed is:

1. A power conversion apparatus, comprising:
a power converter comprising one or more switching devices;
a controller configured to operate the one or more switching devices to convert an input voltage to a regulated output voltage for delivery to a load in an output system; and
a feedback loop configured to monitor the regulated output voltage and operatively coupled to the controller, so as to adapt operation of the power converter to maintain the regulated output voltage at a desired level, the feedback loop further comprising:
one or more sensors configured to detect a plurality of fault conditions in the output system;
a serializing circuit configured to serialize data representative of the plurality of detected fault conditions into a stream of digital fault condition data; and
a first optocoupler to transmit the stream of digital fault condition data to the controller;
wherein the controller further comprises an input pin configured to receive analog feedback from a second optocoupler of the output system.

2. The apparatus of claim 1, wherein the controller is further configured to respond to the stream of digital fault condition data based, at least in part, on a type of fault condition that is encoded by the stream of digital fault condition data.

3. The apparatus of claim 1, wherein the controller further comprises a parallelizing circuit configured to parallelize the transmitted stream of digital fault condition data.

4. The apparatus of claim 1, wherein at least one of the plurality of detected fault conditions comprises one of the following conditions: output system short circuit, output system over-voltage, output system under-voltage, and output system over temperature.

5. The apparatus of claim 1, wherein the analog feedback comprises voltage regulation information.

6. The apparatus of claim 1, wherein the first optocoupler is further configured to transmit voltage regulation information.

7. The apparatus of claim 6, wherein the voltage regulation information is converted from analog form to digital form before being transmitted by the first optocoupler.

8. A method of operating a power conversion circuit comprising one or more switching devices, and a controller operating the one or more switching devices to produce a regulated output voltage for delivery to a load in an output system, the method comprising:
monitoring the regulated output voltage with a feedback loop operatively coupled to the controller;
adapting operation of the power conversion circuit to maintain the regulated output voltage at a desired level;
detecting, with one or more sensors in the feedback loop, one or more fault conditions in the output system;
serializing, with a serializing circuit, data representative of the one or more detected fault conditions into a stream of digital fault condition data;
transmitting, with a first optocoupler, the stream of digital fault condition data to the controller; and
receiving analog feedback, via an input pin of the controller, from a second optocoupler of the output system.

9. The method of claim 8, further comprising:
responding, with the controller, to the stream of digital fault condition data based, at least in part, on a type of fault condition that is encoded by the stream of digital fault condition data.

10. The method of claim 8, further comprising:
parallelizing, with a parallelizing circuit of the controller, the transmitted stream of digital fault condition data.

11. The method of claim 8, wherein at least one of the one or more detected fault conditions comprises one of the following conditions: output system short circuit, output system over-voltage, output system under-voltage, and output system over temperature.

12. The method of claim 8, wherein the analog feedback comprises voltage regulation information.

13. The method of claim 8, further comprising:
transmitting voltage regulation information via the first optocoupler.

14. The method of claim 13, wherein the voltage regulation information is converted from analog form to digital form before being transmitted by the first optocoupler.

15. A power conversion apparatus comprising:
a power source for generating an input voltage;
a power converter comprising one or more switching devices;
a controller configured to operate the one or more switching devices so as to convert the input voltage to a regulated output voltage for delivery to a load in an output system;
a feedback loop configured to monitor the regulated output voltage and operatively coupled to the controller, so as to adapt operation of the power converter to maintain the regulated output voltage at a desired level, the feedback loop further comprising:
a first sensor configured to: receive a stream of digital fault condition data; receive output system voltage information; and sense an amount of input current;
one or more second sensors configured to detect a plurality of fault conditions in the output system;
a serializing circuit configured to serialize data representative of the plurality of detected fault conditions into a stream of digital fault condition data;
a first optocoupler to transmit the stream of digital fault condition data to the first sensor;
a second optocoupler to transmit the output system voltage to the first sensor; and
a parallelizing circuit configured to parallelize the stream of digital fault condition data into individual fault condition codes.

16. The power conversion apparatus of claim 15, wherein the controller is further configured to respond to the stream of digital fault condition data based, at least in part, on a type of fault condition that is encoded by the stream of digital fault condition data.

17. The power conversion apparatus of claim 15, wherein the regulated output voltage is monitored, at least in part, using a shunt regulator.

18. The power conversion apparatus of claim 15, wherein at least one of the plurality of detected fault conditions comprises one of the following conditions: output system short circuit, output system over-voltage, output system under-voltage, and output system over temperature.

19. A power conversion apparatus comprising:
a power source for generating an input voltage;
a power converter comprising one or more switching devices;
a controller configured to operate the one or more switching devices so as to convert the input voltage to a regulated output voltage for delivery to a load in an output system;
a feedback loop configured to monitor the regulated output voltage and operatively coupled to the controller, so as to adapt operation of the power converter to maintain the regulated output voltage at a desired level, the feedback loop further comprising:
a first sensor configured to: receive a stream of digital fault condition data; receive output system voltage information; and sense an amount of input current;
one or more second sensors configured to detect a plurality of fault conditions in the output system;
a serializing circuit configured to serialize data representative of the plurality of detected fault conditions into a stream of digital fault condition data;
an optocoupler to transmit the output system voltage and the stream of digital fault condition data to the first sensor; and
a parallelizing circuit configured to parallelize the stream of digital fault condition data into individual fault condition codes.

20. The power conversion apparatus of claim 19, wherein the controller is further configured to respond to the stream of digital fault condition data based, at least in part, on a type of fault condition that is encoded by the stream of digital fault condition data.

21. The power conversion apparatus of claim 19, wherein the regulated output voltage is monitored, at least in part, using a shunt regulator.

22. The power conversion apparatus of claim 19, wherein at least one of the plurality of detected fault conditions comprises one of the following conditions: output system short circuit, output system over-voltage, output system under-voltage, and output system over temperature.

* * * * *